US012126263B2

(12) United States Patent
Yanagi et al.

(10) Patent No.: US 12,126,263 B2
(45) Date of Patent: Oct. 22, 2024

(54) POWER CONVERSION CIRCUIT, POWER MODULE, CONVERTER, AND INVERTER

(71) Applicant: ROHM CO., LTD., Kyoto (JP)

(72) Inventors: Tatsuya Yanagi, Kyoto (JP); Hirotaka Otake, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 70 days.

(21) Appl. No.: 17/704,618

(22) Filed: Mar. 25, 2022

(65) Prior Publication Data
US 2022/0216795 A1 Jul. 7, 2022

Related U.S. Application Data

(63) Continuation of application No. PCT/JP2020/020053, filed on May 21, 2020.

(30) Foreign Application Priority Data

Sep. 27, 2019 (JP) .................. 2019-176427

(51) Int. Cl.
H02M 3/158 (2006.01)
H02M 1/08 (2006.01)
H02M 7/5395 (2006.01)

(52) U.S. Cl.
CPC ........... *H02M 3/1588* (2013.01); *H02M 1/08* (2013.01); *H02M 7/5395* (2013.01)

(58) Field of Classification Search
CPC ..... H02M 1/08; H02M 3/1588; H02M 7/5395
See application file for complete search history.

(56) References Cited

U.S. PATENT DOCUMENTS

| 2007/0131938 A1* | 6/2007 | Williams | ............ H01L 27/0605 |
| | | | 257/E27.012 |
| 2018/0159440 A1* | 6/2018 | Xu | ........................ H02M 7/537 |
| 2020/0035656 A1 | 1/2020 | Miyazaki et al. | |

FOREIGN PATENT DOCUMENTS

| JP | H05226994 A | 9/1993 |
| JP | 2007228711 A | 9/2007 |
| WO | 2018186353 A1 | 10/2018 |

OTHER PUBLICATIONS

International Search Report for International Application No. PCT/JP2020/020053; Date of Mailing, Jul. 21, 2020.
JPO Notice of Reasons for Refusal for corresponding JP Application No. 2021-548328; Issued May 7, 2024; 9 pages.
JPO Notice of Reasons for Refusal for corresponding JP Application No. 2021-548328; Issued Aug. 27, 2024.

* cited by examiner

*Primary Examiner* — Kyle J Moody
*Assistant Examiner* — Lakaisha Jackson
(74) *Attorney, Agent, or Firm* — CANTOR COLBURN LLP

(57) ABSTRACT

A power conversion circuit in which a switching transistor and a synchronous rectifier transistor are connected in series, and a source inductance of the switching transistor is smaller than a source inductance of the synchronous rectifier transistor.

11 Claims, 18 Drawing Sheets

POWER CONVERSION CIRCUIT, POWER MODULE, CONVERTER, AND INVERTER

CROSS REFERENCE TO RELATED APPLICATIONS

This application is a continuation under 35 U.S.C. § 120 of PCT/JP2020/020053, filed on May 21, 2020, which is incorporated herein by reference, and which claimed priority to Japanese Application No. 2019-176427, filed Sep. 27, 2019. The present application likewise claims priority under 35 U.S.C. § 119 to Japanese Application No. 2019-176427, filed Sep. 27, 2019, the entire content of which is also incorporated herein by reference.

BACKGROUND OF THE INVENTION

Technical Field

The present embodiment relates to a power conversion circuit, a power module, a converter, and an inverter.

Background of the Invention

In a half bridge circuit or a full bridge circuit in which two elements (a switching element and a synchronous rectifier element) are connected in series, when the two elements are simultaneously switched on, a short circuit occurs between a power source and a ground, and a large through-current flows. This large through-current causes a loss in the switching element or destroys the switching element itself.

In order to prevent such a through-current, a pause period (dead time) for switching off all the elements is required during a transition period of the on-and-off state of the elements. However, when one element is switched on from a dead time state in which all the elements are switched off, a phenomenon in which a gate of the other element is switched on due to a change in drain voltage (erroneous ignition or erroneous switching-on) may occur. This problem may occur, for example, in a three-phase inverter for driving a motor or in a synchronous rectifier DC/DC converter.

In recent years, many research institutes have been conducting research and development on silicon carbide (SiC) devices. Features of SiC power devices include low on-resistance, fast switching and high temperature operation, which are superior to conventional Si power devices.

Generally, when a switching element that operates at a high speed is used, source sense signal wiring is connected to the switching element. The electromotive force of the source inductance of the switching element does not affect a gate circuit, and a potential difference used for charging a gate oxide film of the switching element can be sufficiently secured, thereby making it possible to increase the current change speed, and as a result, the loss (switching loss) generated when the switching element is switched on and off is reduced.

Meanwhile, since only a charge/discharge current contributes to a current change in a voltage change region, the contribution is relatively small, and the difference in a voltage change of a switching element depending on whether or not source sense signal wiring is connected is small. In other words, the difference in the voltage change is almost equal.

The switching characteristics of a synchronous rectifier element are determined by the operation of a switching element. In a half bridge circuit, the switching element and the synchronous rectifier element are connected in series, and a short circuit of the switching element and the synchronous rectifier element caused by erroneous switching-on of the synchronous rectifier element is a problem.

A short circuit occurs in a voltage change region, but the electromotive force of source inductance on the reflux side in a current change region occurring before the voltage change region greatly affects a short circuit. The electromotive direction of source inductance of the synchronous rectifier element in the current change region is the same as the electromotive direction of source inductance of the switching element, and the voltage of a gate oxide film of each element in the voltage change region increases in the positive direction.

Since source inductance is shared with a gate circuit in a synchronous rectifier element not connected to source sense signal wiring, a gate oxide film is negatively charged by an electromotive force. Accordingly, the starting point of an increase in voltage in the voltage change region becomes low, and thus a short circuit hardly occurs.

Since source signal wiring is separated in an element connected to source sense signal wiring, the electromotive force of source inductance does not affect the voltage of a gate oxide film. Accordingly, a short circuit is likely to occur due to an increase in voltage in the voltage change region.

A short circuit increases power loss in elements. In a half bridge circuit composed of elements connected to source sense signal wiring, the advantage of low power loss is obtained by a performance improvement in the switching characteristics of the elements connected to the source sense signal wiring; however, such an advantage may be lost due to a short circuit.

SUMMARY OF THE INVENTION

The present embodiment makes it possible to provide a power conversion circuit that prevents a short circuit between a switching element and a synchronous rectifier element, and reduces power loss of the switching element and the synchronous rectifier element. Further, another aspect of the present embodiment makes it possible to provide a power module including the power conversion circuit. Furthermore, another aspect of the present embodiment makes it possible to provide a converter and an inverter including the power module.

DETAILED DESCRIPTION OF THE INVENTION

Figure 1:
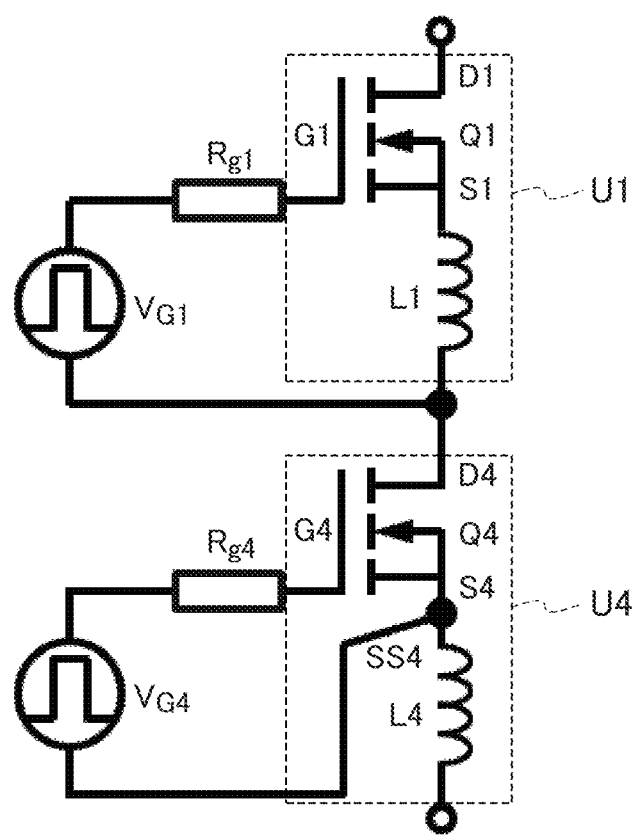
FIG. 1 is a power conversion circuit according to an aspect of the present embodiment.

Next, the present embodiment will be described with reference to the drawings. In the drawings described below, the same or similar portions are denoted by the same or similar reference numerals. It should be noted, however, that the drawings are schematic and that the relationships between the thickness of each component and the plane dimensions are different from the actual ones. Therefore, the specific thicknesses and sizes should be determined in consideration of the following description. In addition, it is needless to say that the drawings include parts having different dimensional relationships and ratios.

Further, the following embodiment exemplifies a device or method for embodying a technical concept, and does not specify the material, shape, structure, arrangement, etc. of each component. Various changes may be made to the present embodiment in the claims.

An aspect of the present embodiment is as follows.

[1] A power conversion circuit in which a switching transistor and a synchronous rectifier transistor are connected in series, and a source inductance of the switching transistor is smaller than a source inductance of the synchronous rectifier transistor.

[2] The power conversion circuit according to [1], further including a capacitor electrically connected to the switching transistor and the synchronous rectifier transistor.

[3] The power conversion circuit according to [2], further including an output terminal electrically connected to the capacitor.

[4] The power conversion circuit according to any one of [1] to [3], further including a power terminal electrically connected to a drain of the switching transistor.

[5] A power module including the power conversion circuit according to any one of [1] to [4].

[6] A power module including: a first transistor having a function of exciting a first inductor and connected to first source sense signal wiring; a second transistor having a function of releasing power stored in the first inductor; a first gate signal wiring and the first source sense signal wiring, which are electrically connected to a gate of the first transistor; and a second gate signal wiring and a first source signal wiring, which are electrically connected to a gate of the second transistor, wherein the first transistor is connected in series with the second transistor, and the first inductor is a power module connected to a connection point between the first transistor and the second transistor.

[7] The power module according to [6], wherein a source inductance of the first transistor is smaller than a source inductance of the second transistor.

[8] The power module according to [6] or [7], further including a capacitor electrically connected to the first transistor and the second transistor.

[9] The power module according to [8], further including an output terminal electrically connected to the capacitor.

[10] The power module according to any one of [6] to [9], further including a power terminal electrically connected to a drain of the first transistor.

[11] The power module according to any one of [6] to [10], wherein the first transistor functions as a switching element, and the second transistor functions as a synchronous rectifier element.

[12] The power module according to any one of [6] to [11], wherein the second transistor outputs a signal to the first source signal wiring via a drain of the first transistor.

[13] The power module according to any one of [6] to [11], wherein the second transistor outputs a signal to the first source signal wiring via a source of the second transistor.

[14] The power module according to [13], further including: a second source signal wiring electrically connected to the first transistor; and a second source sense signal wiring electrically connected to the second transistor, wherein the first transistor outputs a signal to the second source signal wiring via a drain of the second transistor.

[15] The power module according to [12], wherein the second transistor and a drain of the first transistor are connected by a first wiring, and when a signal is output from a gate of the second transistor to the first source signal wiring, a current tolerance of the first wiring is greater than a current tolerance of wiring directly connected to the second gate signal wiring.

[16] The power module according to [13], wherein when a signal is output from a gate of the second transistor to the first source signal wiring, a current tolerance of a second wiring passing through a source of the second transistor is greater than a current tolerance of wiring directly connected to the second gate signal wiring.

[17] A converter including the power module according to any one of [5] to [16].

[18] An inverter including the power module according to any one of [5] to [16].

Power Conversion Circuit

A power conversion circuit according to the present embodiment will be described below.

FIG. 1 is a power conversion circuit according to an aspect of the present embodiment, which includes a transistor U1 serving as a synchronous rectifier element, a transistor U4 serving as a switching element, gate resistances Rg1 and Rg4, and gate drive circuits VG1 and VG4. The power conversion circuit has a plurality of insulated gate field effect transistors (MISFET: metal-insulator-semiconductor field effect transistor), and the transistor U1 includes a MISFET chip Q1 functioning as a synchronous rectifier element, and the wiring of the transistor U1 has an inductance L1. The transistor U4 includes a MISFET chip Q4 functioning as a switching element, and source sense signal wiring SS4, and the wiring of the transistor U4 has an inductance L4.

A first inductor (not shown) is connectable to a connection point (represented by ● in FIG. 1) between the transistor U1 and the transistor U4. The gate drive circuit VG1 monitors the source of the MISFET chip Q1 via the inductance L1 of the wiring, and provides a driving signal to the gate of the MISFET chip Q1 via the gate resistance Rg1 according to the monitoring result. The inductance L1 is a current path for current supplied between the source and the drain of the MISFET chip Q1. The gate drive circuit VG4 monitors the source of the MISFET chip Q4 via the source sense signal wiring SS4, and provides a drive signal to the gate of the MISFET chip Q4 via the gate resistance Rg4 according to the monitoring result. The inductance L4 is a current path for current supplied between the source and the drain of the MISFET chip Q4, and the source sense signal wiring SS4 is a signal path provided separately from the current path.

The MISFET chip Q4 has a function of exciting a first inductor (not shown), and the MISFET chip Q1 has a function of releasing power stored in the first inductor. A fast switching operation is possible with a smaller source inductance, and a short circuit associated with a fast switching operation is less likely to occur with a larger source inductance. Accordingly, a transistor having a small source inductance and source signal wiring is used as a switching element that determines the switching characteristics and excites a first inductor, and a transistor having a large source inductance and not having source signal wiring is used as a switch (synchronous rectifier element) that determines the degree of occurrence of a short circuit and releases power stored in the inductor, thereby making it possible to obtain a power conversion circuit having a high speed and a low loss and in which a short circuit is less likely to occur.

Figure 2:
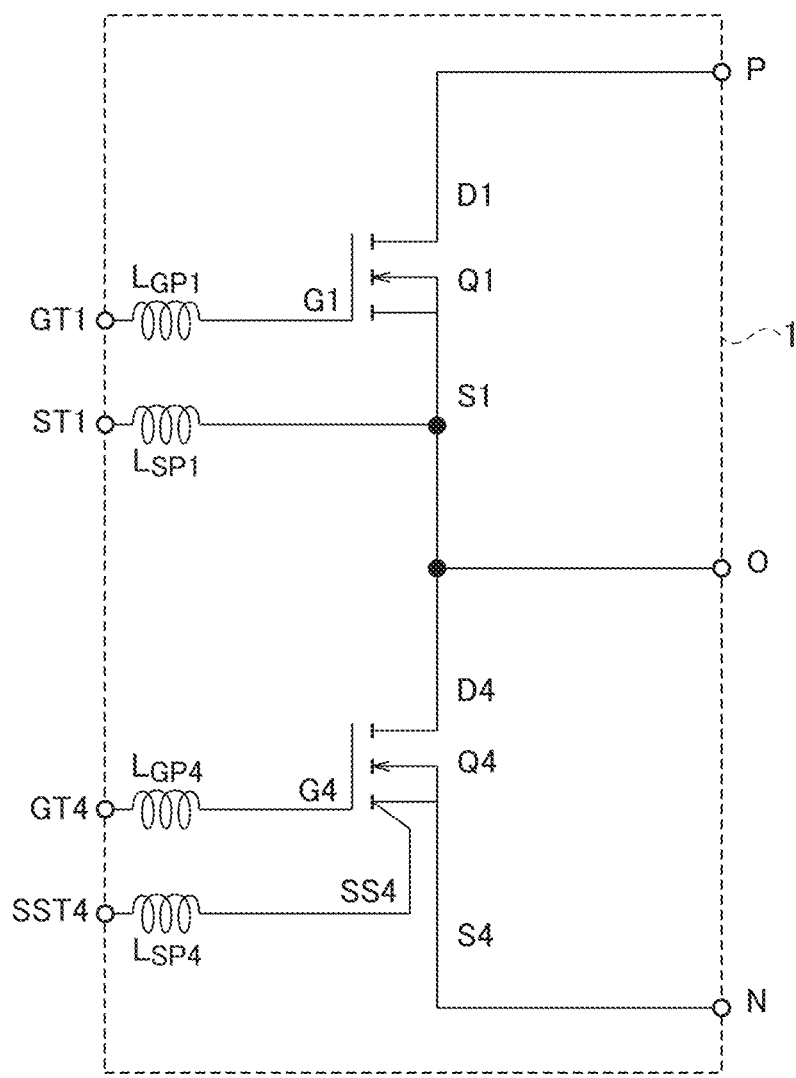
FIG. 2 is a schematic circuit diagram of the power conversion circuit according to an aspect of the present embodiment, which is a half-bridge circuit.
Figure 3:
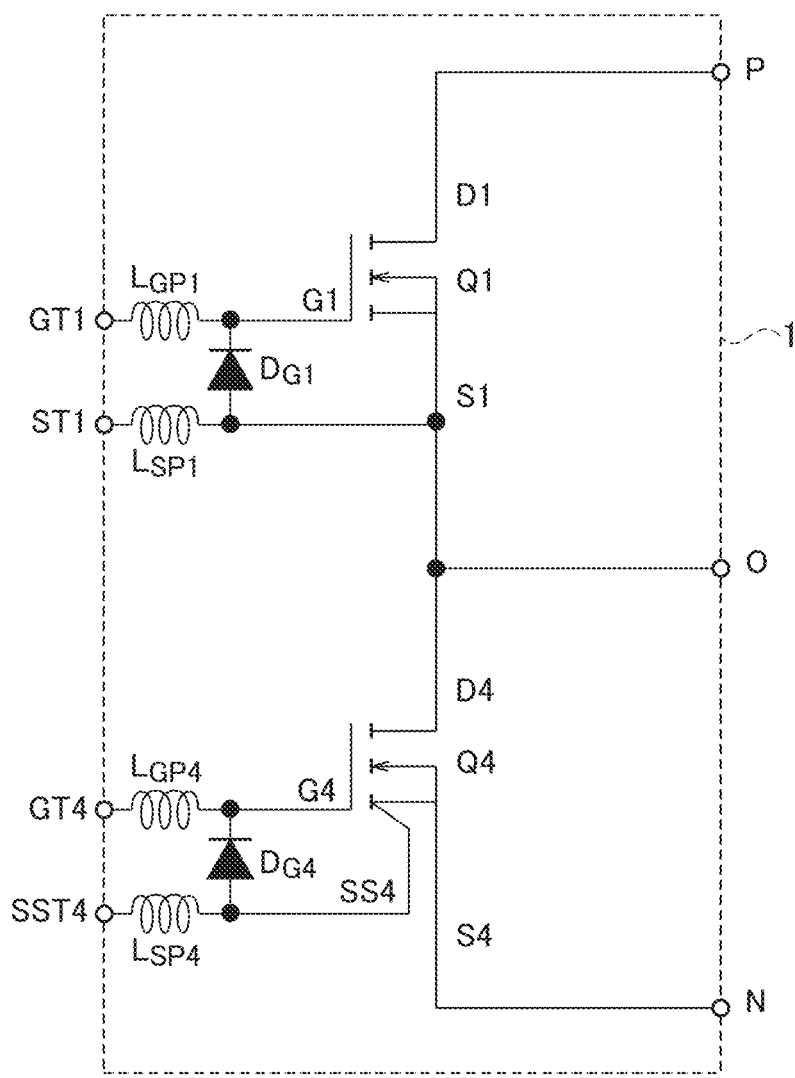
FIG. 3 is a schematic circuit diagram of the power conversion circuit according to an aspect of the present embodiment, which is a half-bridge circuit.

The power conversion circuit shown in FIG. 1 will be described in more detail with reference to FIGS. 2 and FIG. 3. The circuit shown in FIGS. 2 and FIG. 3 is a power conversion circuit 1, and is an example of a schematic circuit configuration of a half bridge circuit. The power conversion circuit 1 according to the present embodiment is not limited to a half bridge circuit, and may be applied to a full bridge circuit or a three-phase bridge circuit.

As described above, the power conversion circuit 1 includes the transistor U1 serving as a synchronous rectifier element and the transistor U4 serving as a switching element having source sense signal wiring SS4. Here, the characteristics of the elements (transistors) depending on whether or not source sense signal wiring is connected will be described.

Figure 12A:
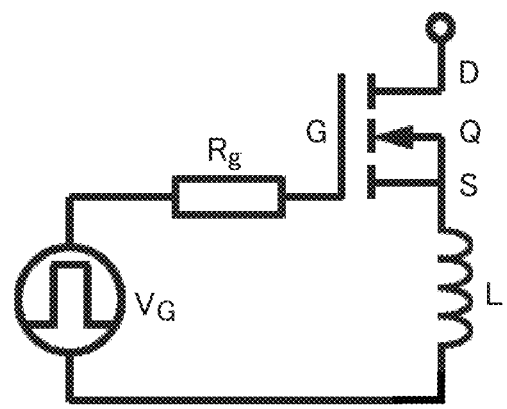
FIG. 12A is a circuit diagram including a transistor, which shows a circuit A including a transistor not connected to source sense signal wiring.
Figure 12B:
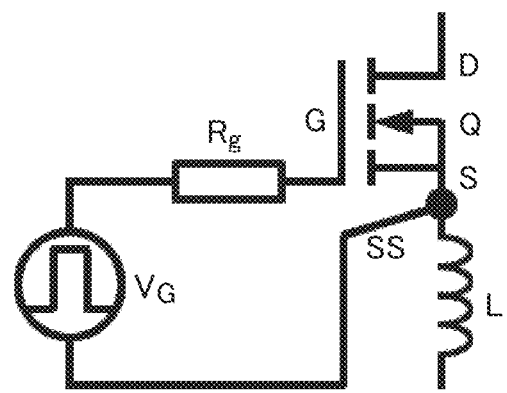
FIG. 12B is a circuit diagram including a transistor, which shows a circuit B including a transistor connected to source sense signal wiring.

FIG. 12A is a circuit A including the MISFET chip Q that is not connected to source sense signal wiring, and FIG. 12B is a circuit B including the MISFET chip Q that is connected to source sense signal wiring SS.

Figure 13:
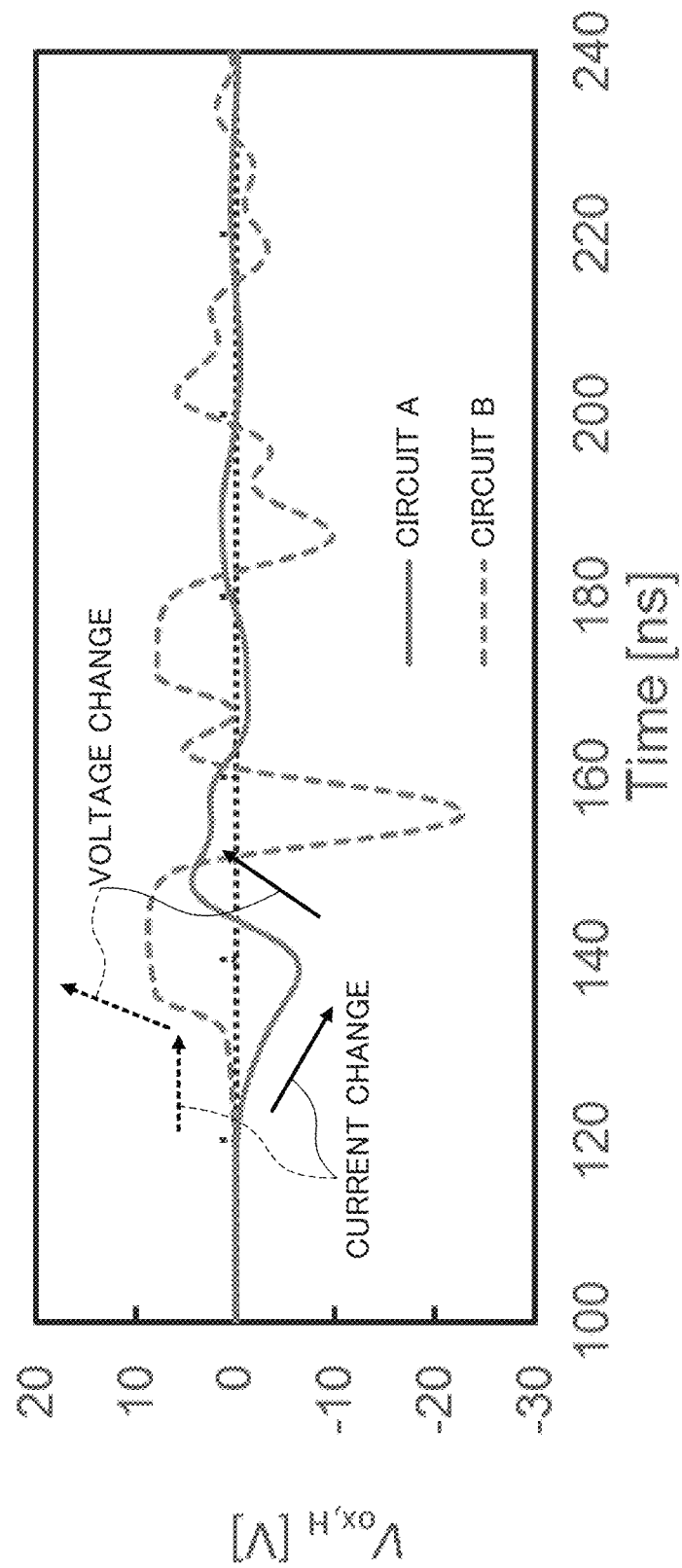
FIG. 13 is a diagram showing a change in voltage of a gate oxide film in a non-driving element.

FIG. 13 shows a change in gate voltage in a non-driving element not performing a switching operation. In this respect, the non-driving element is either one of the switching element and the synchronous rectifier element.

In a current change region (current change period) in the figure, since the circuit A has a source inductance shared with a gate circuit, a gate oxide film is negatively charged by an electromotive force. Meanwhile, since the circuit B has an element connected to the source sense signal wiring and the source signal wiring is separated, the electromotive force of the source inductance does not affect the voltage of a gate oxide film.

In a voltage change region (voltage change period) in the figure, the starting point of the increase in voltage is low in the circuit A, while the starting point of the increase in voltage is high in the circuit B. The circuit B tends to exceed a threshold voltage of the element and to switch on erroneously, while the circuit A hardly exceeds the threshold voltage of the element and tends to operate normally because the starting point of the increase in voltage is low.

Accordingly, in order to operate the power conversion circuit normally at a high speed, it is effective to use both a switching element connected to the source sense signal wiring and a synchronous rectifier element not connected to the source sense signal wiring. This configuration prevents erroneous switching-on by utilizing the switching characteristics of the switching element connected to the source sense signal wiring and utilizing the low starting point of the increase in voltage of the synchronous rectifier element not connected to the source sense signal wiring, thereby making it possible to ensure operation stability of the power conversion circuit.

Figure 16:
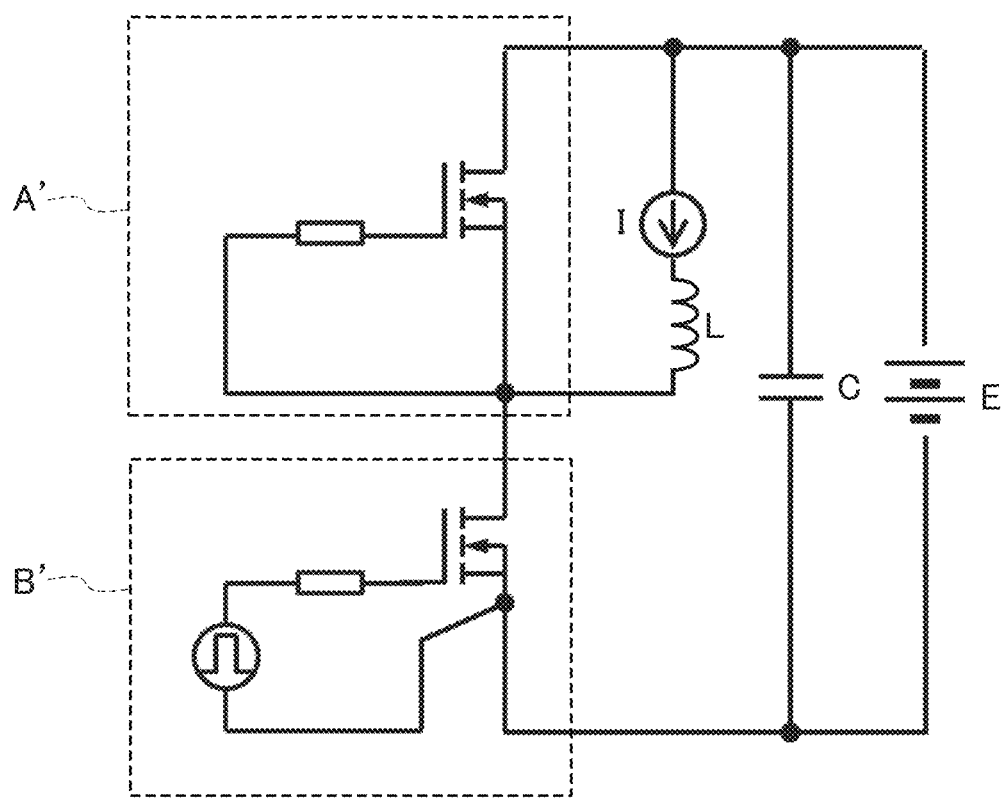
FIG. 16 is a circuit diagram of a circuit for use in a double pulse test.

Further, the operation waveforms and losses of the transistors according to a double pulse test are compared in the power conversion circuit of the present embodiment and a conventional power conversion circuit. FIG. 16 shows a circuit (DPT (double pulse test) circuit) used in a double pulse test. In this case, the configuration of a circuit A' and a circuit B' shows the power conversion circuit of the present embodiment, and the operational waveforms and losses of the transistors due to the difference between the circuit A' and the circuit B' are compared.

As shown in FIG. 16, a power source E, a capacitor C, an inductor L, and a constant current source I are connected to the circuit A' and the circuit B' in the configuration of the transistor included in the circuit A' and the transistor included in the circuit B'. The transistor included in the circuit A' functions as a synchronous rectifier element, and the transistor included in the circuit B' functions as a switching element.

Figure 17C:
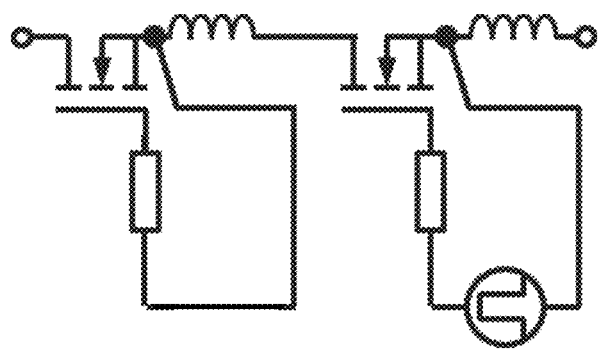
FIG. 17C is a circuit diagram showing a combination of circuits A' and B' shown in FIG. 16, wherein shows a combination where both of the circuit A' and circuit B' include transistors connected to source sense signal wiring.
Figure 17B:
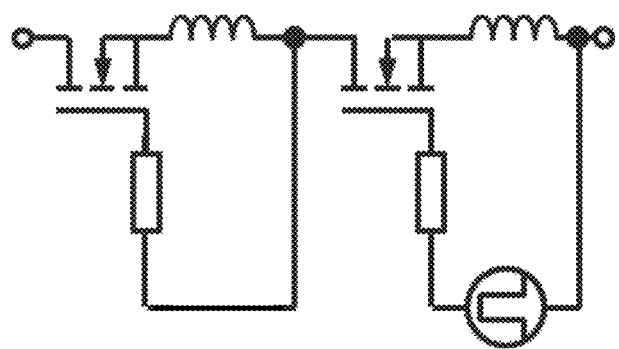
FIG. 17B is a circuit diagram showing a combination of circuits A' and B' shown in FIG. 16, wherein shows a combination where both of the circuit A' and circuit B' include transistors not connected to source sense signal wiring.
Figure 17A:
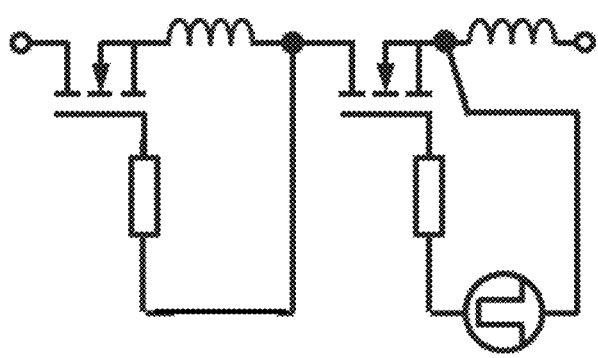
FIG. 17A is a circuit diagram showing a combination of circuits A' and B' shown in FIG. 16, wherein shows a combination where a circuit A' includes a transistor not connected to source sense signal wiring and a circuit B' includes a transistor connected to source sense signal wiring.

In the DPT circuit, the power source E is 800 V and the constant current source I is 16 A. FIGS. 17A to FIG. 17C are a circuit diagram showing a combination of the circuits A' and B' of the DPT circuit. FIG. 17A shows a combination where the circuit A' includes a transistor (SiC MOSFET S4108 manufactured by ROHM Co., Ltd.) not connected to source sense signal wiring and the circuit B' includes a transistor (SiC MOSFET S4108 manufactured by ROHM Co., Ltd.) connected to source sense signal wiring, FIG. 17B shows a combination where both of the circuit A' and circuit B' include transistors (SCT 3080KL manufactured by ROHM Co., Ltd.) not connected to source sense signal wiring, and FIG. 17C shows a combination where both of the circuit A' and circuit B' include transistors (SiC MOSFET S4108 manufactured by ROHM Co., Ltd.) connected to source sense signal wiring.

In the DPT circuit described above, the circuit shown in FIG. 17A is the configuration of Example 1 including the power conversion circuit of the present embodiment, the circuit shown in FIG. 17B is the configuration of Comparative Example 1 including a conventional power conversion circuit, and the circuit shown in FIG. 17C is the configuration of Comparative Example 2 including a conventional power conversion circuit. The circuit symbols and the like shown in FIGS. 17A to FIG. 17C are omitted because the circuit symbols and the like shown in FIGS. 12A and FIG. 12B can be used.

Figure 18A:
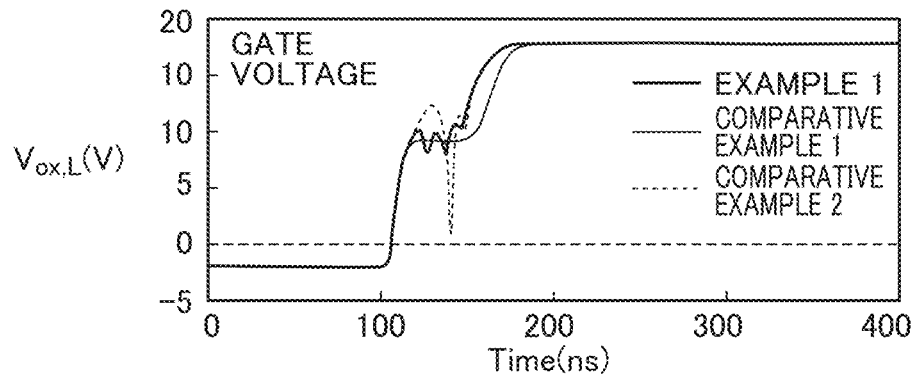
FIG. 18A is a diagram showing operation waveforms of the transistor included in the circuit B', wherein a gate voltage is indicated in the respective operation waveforms.
Figure 18B:
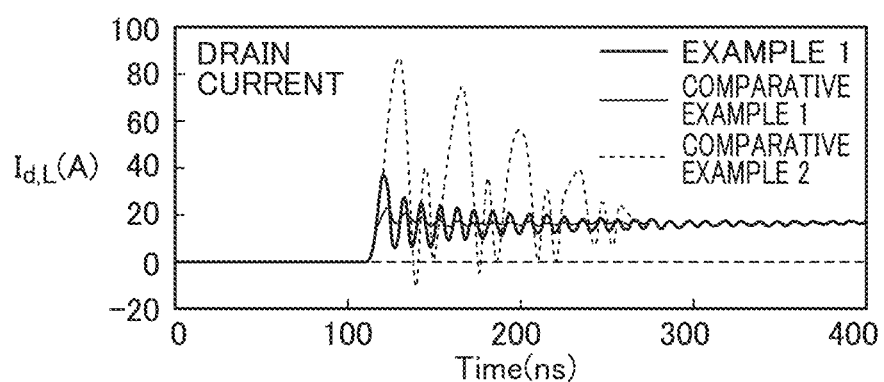
FIG. 18B is a diagram showing operation waveforms of the transistor included in the circuit B', wherein a drain current is indicated in the respective operation waveforms.
Figure 18C:
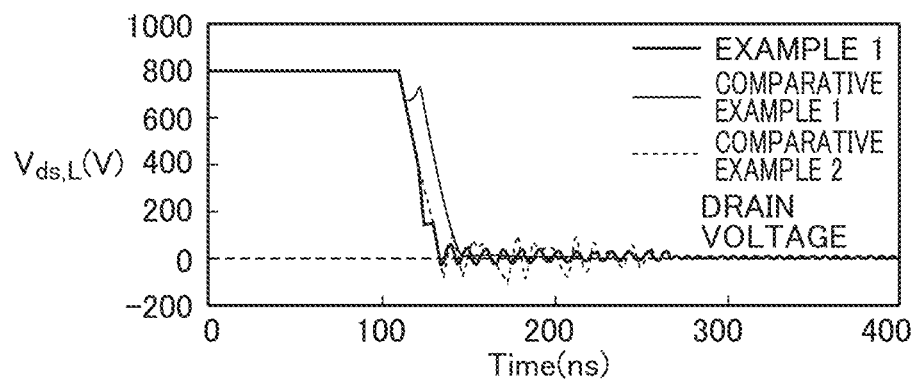
FIG. 18C is a diagram showing operation waveforms of the transistor included in the circuit B', wherein a drain voltage are indicated in the respective operation waveforms.
Figure 19A:
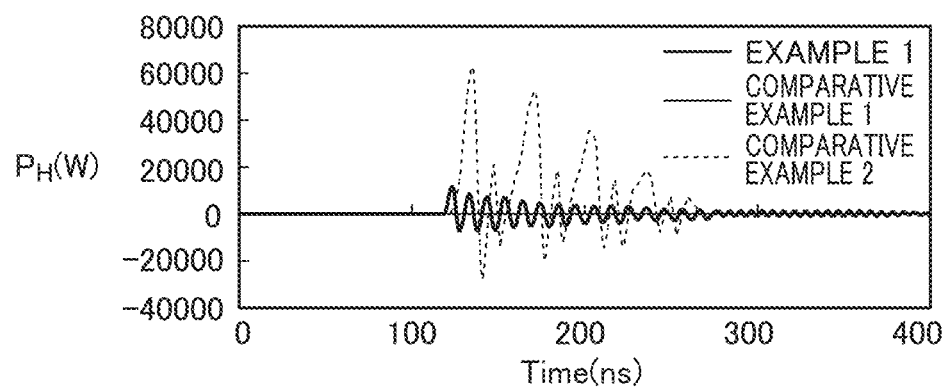
FIG. 19A is a diagram showing losses of the transistors included in the circuit A' and circuit B', wherein shows a synchronous rectifier element loss of the transistor included in the circuit A'.
Figure 19B:
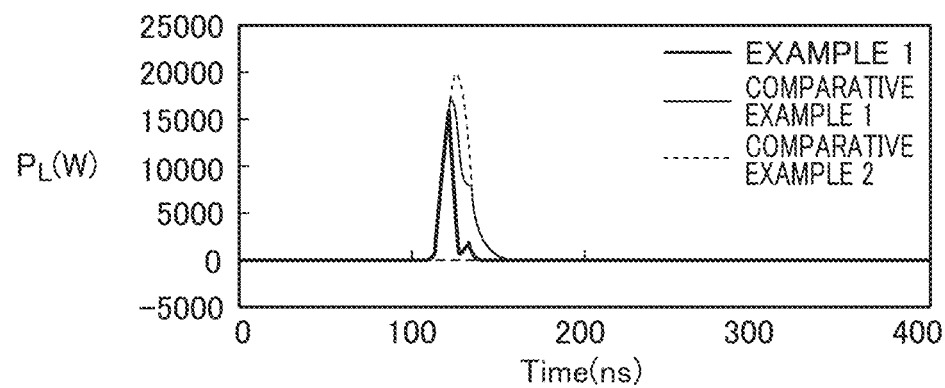
FIG. 19B is a diagram showing losses of the transistors included in the circuit A' and circuit B', wherein shows a switching element loss of the transistor included in the circuit B'.

FIGS. 18A to FIG. 18C, FIG. 19A and FIG. 19B show the operation waveforms and losses of the transistors according to a double pulse test in the power conversion circuit described above. FIG. 18A is a diagram showing the operation waveform of a gate voltage (Vox,L) of the transistor included in the circuit B', FIG. 18B is a diagram showing the operation waveform of a drain current (Id,L) of the transistor included in the circuit B', and FIG. 18C is a diagram showing the operation waveform of a drain voltage (Vds,L) of the transistor included in the circuit B'. FIG. 19A is a diagram showing a synchronous rectifier element loss (PH (W)) of the transistor included in the circuit A', and FIG. 19B is a diagram showing a switching element loss (PL(W)) of the transistor included in the circuit B'.

As shown in FIG. 18A, the operation waveform of the gate voltage does not show much difference between Example 1 and Comparative Examples 1 and 2. Meanwhile, as shown in FIG. 18B, regarding the operation waveform of the drain current, Comparative Example 2 has a large change in the current and is in a state in which the drain current tends to be erroneously switched on, while Example 1 has a gradual change in the current as in Comparative Example 1. Further, as shown in FIG. 18C, regarding the operation waveform of the drain voltage, the starting point of the voltage change in Comparative Example 1 is later than that in Comparative Example 2, but the starting point of the voltage change in Example 1 is faster than that in Comparative Example 1 as in Comparative Example 2. Accordingly, as shown in FIG. 19A, the synchronous rectifier element loss of the transistor in Example 1 is smaller than that in Comparative Example 1 and Comparative Example 2, and as shown in FIG. 19B, the switching loss of the transistor in Example 1 is smaller than that in Comparative Example 1 and Comparative Example 2.

As described above, the present embodiment can make a synchronous rectifier element loss and a switching element loss to be smaller than those of the conventional power conversion circuits by using both a transistor functioning as a switching element connected to source sense signal wiring and a transistor functioning as a synchronous rectifier element not connected to source sense signal wiring, thereby making it possible to obtain a power conversion circuit which operates normally at a high speed.

The power conversion circuit 1 may include a control circuit to be described later, for example, a gate diode as shown in FIG. 3.

As shown in FIG. 3, there is a gate terminal GT1 and a source terminal ST1 for external extraction, a gate G1 and a source S1 of the MISFET chip Q1, and parasitic inductances LGP1 and LSP1 associated with the routing of electrode wiring, the parasitic inductance LGP1 being between the gate terminal GT1 and the gate G1, and the parasitic inductance LSP1 being between the source terminal ST1 and the source S1. Further, there is a gate terminal GT4 and a source sense terminal SST4 for external extraction, a gate G4 and source sense signal wiring SS4 of the MISFET chip Q4, and parasitic inductances LGP4 and LSP4 associated with the routing of electrode wiring, the parasitic inductance LGP4 being between the gate terminal GT4 and the gate G4, and the parasitic inductance LSP4 being between the source sense terminal SST4 and source sense signal wiring SS4. Such inductance components exist in the gate closed circuit of the MISFET chip, thereby causing an operation delay in driving the gate of the MISFET chip and an increase in voltage fluctuation between the gate and the source sense when the voltage between the drain and the source changes.

In order to prevent a parasitic effect caused by such inductance components, the distance from a cathode and anode of a diode to a gate pad electrode and source pad may be reduced, and the shorter the distance, the greater the prevention effect. The gate pad electrode and the source pad electrode of the MISFET are formed on the surface of the MISFET. Accordingly, a gate diode may be formed in the same chip as the MISFET, or an anode of the chip of the gate diode may be directly soldered onto the source pad electrode of the MISFET.

Further, although the gate diodes may be arranged collectively for each MISFET arranged in parallel, it is more effective to have the gate diodes individually connected to each of the plurality of MISFETs.

Figure 4:
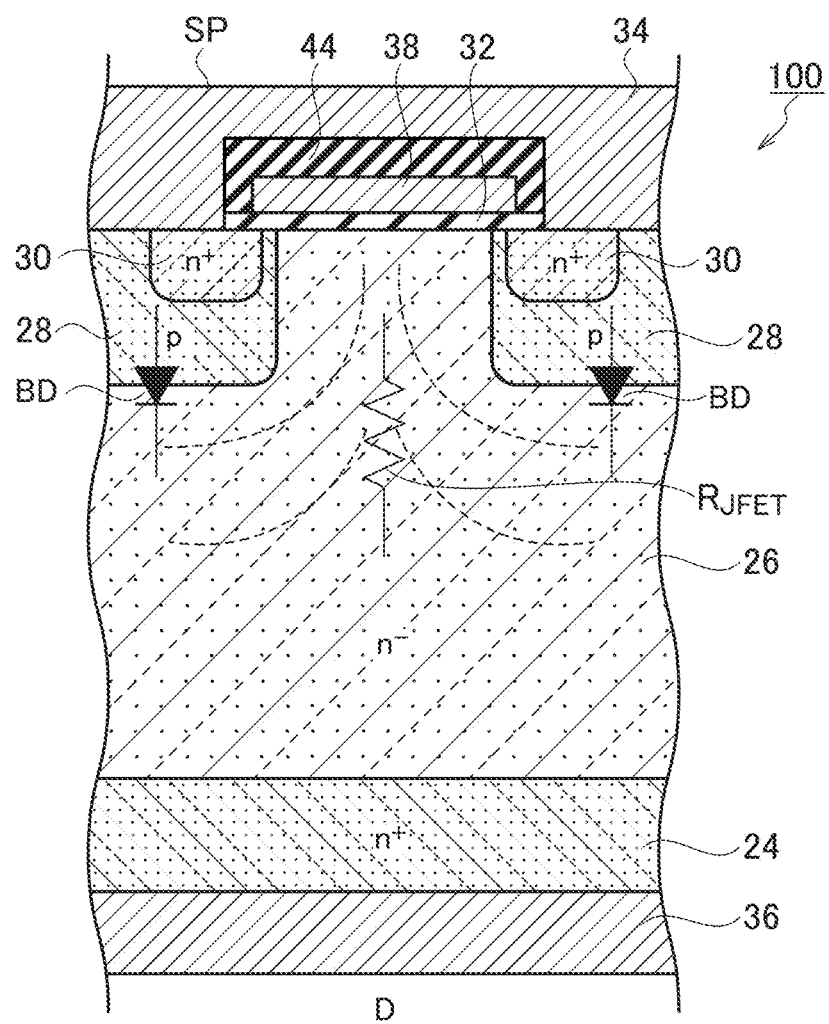
FIG. 4 is a schematic cross-sectional view of a SiC DIMISFET, which is an example of a semiconductor device applicable to the power conversion circuit according to an aspect the present embodiment.

The MISFET may be composed of a SiC MISFET. FIG. 4 shows a schematic cross-sectional structure of the SiC DIMISFET (DI: double implanted), which is an example of a semiconductor device 100 applicable to the power conversion circuit 1.

As shown in FIG. 4, the SiC DIMISFET includes: a semiconductor substrate 26 composed of an n− high-resistance layer; p-body regions 28 formed on the front surface side of the semiconductor substrate 26; n+ source regions 30 formed on the front surface of the p-body regions 28; a gate insulating film 32 disposed on the front surface of the semiconductor substrate 26 between the p-body regions 28; a gate electrode 38 disposed on the gate insulating film 32; a source electrode 34 connected to the source regions 30 and the p-body regions 28; an n+ drain region 24 disposed on the rear surface opposite to the front surface of the semiconductor substrate 26; and a drain electrode 36 connected to the n+ drain region 24.

In FIG. 4, in the semiconductor device 100, the p-body regions 28 and the n+ source regions 30 formed on the surface of the p-body regions 28 are formed by double ion implantation (DI), and the source pad electrode SP is connected to the source electrode 34 connected to the source regions 30 and the p-body regions 28. The gate pad electrode (not shown) is connected to the gate electrode 38 disposed on the gate insulating film 32. As shown in FIG. 4, the source pad electrode SP and the gate pad electrode (not shown) are disposed on a passivation interlayer insulating film 44 covering the surface of the semiconductor device 100.

In the SiC DIMISFET, as shown in FIG. 4, since a depletion layer as represented by a broken line is formed in the semiconductor substrate 26 composed of the n− high-resistance layer sandwiched between the p-body regions 28, a channel resistance RJFET associated with the junction type FET (JFET) effect is formed. Further, the body diodes BD are formed between the p-body regions 28 and the semiconductor substrate 26.

Figure 5:
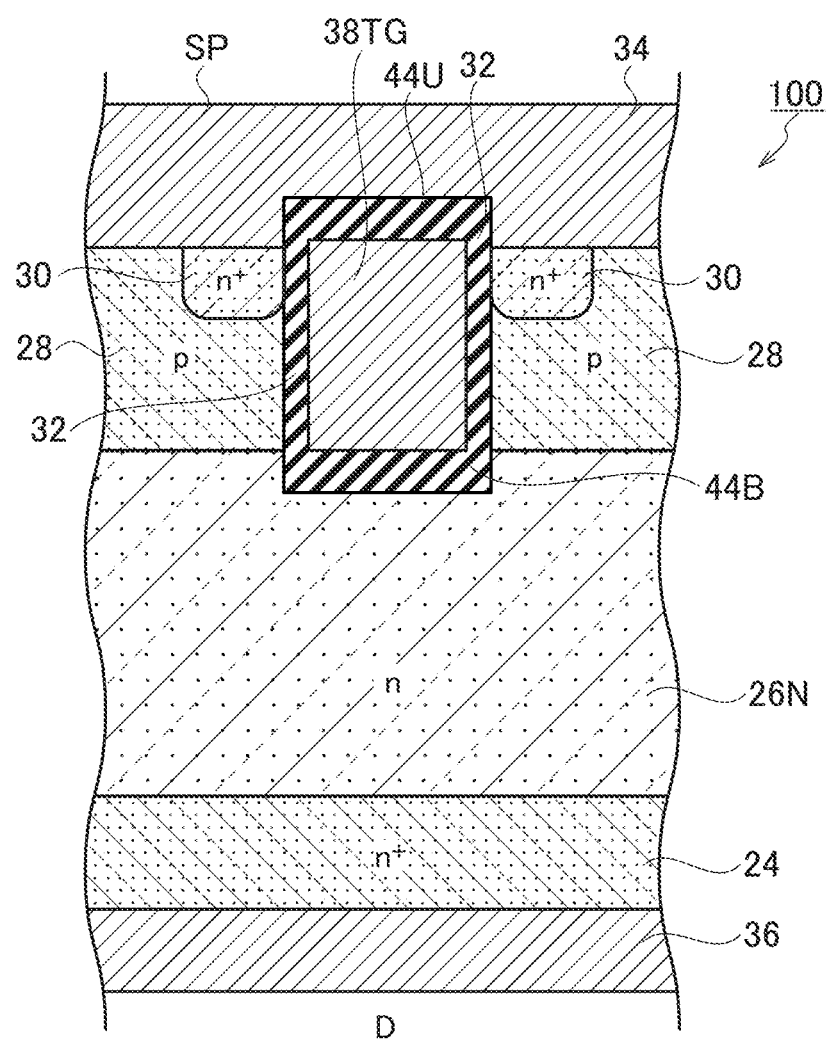
FIG. 5 is a schematic cross-sectional view of the SiC TMISFET, which is an example of the semiconductor device applicable to the power conversion circuit according to an aspect the present embodiment.

The MISFET may be composed of a SiC TMISFET (T: trench). FIG. 5 shows a schematic cross-sectional structure of the SiC TMISFET, which is an example of the semiconductor device 100 applicable to the power conversion circuit 1.

As shown in FIG. 5, the SiC TMISFET includes: a semiconductor substrate 26N composed of an n layer; the p-body regions 28 formed on the front surface side of the semiconductor substrate 26N; the n+ source regions 30 formed on the front surface of the p-body regions 28; a trench gate electrode 38TG formed with the gate insulating film 32 and interlayer insulating films 44U and 44B therebetween, inside a trench which penetrates the p-body regions 28 and is formed up to the semiconductor substrate 26N; the source electrode 34 connected to the n+ source regions 30 and the p-body regions 28; the n+ drain region 24 disposed on the rear surface opposite to the front surface of the semiconductor substrate 26N; and the drain electrode 36 connected to the n+ drain region 24.

In FIG. 5, in the semiconductor device 100, the trench gate electrode 38TG is formed with the gate insulating film 32 and the interlayer insulating films 44U and 44B therebetween, inside a trench which penetrates the p-body regions 28 and is formed up to the semiconductor substrate 26N. Further, the source pad electrode SP is connected to the source electrode 34 connected to the source regions 30 and the p-body regions 28. The gate pad electrode (not shown) is connected to the gate electrode 38 disposed on the gate insulating film 32. As shown in FIG. 5, the source pad electrode SP and the gate pad electrode (not shown) are disposed on a passivation interlayer insulating film 44U covering the surface of the semiconductor device 100.

In the SiC TMISFET, the channel resistance RJFET associated with the junction type FET (JFET) effect such as that of the SiC DIMISFET is not formed. Further, the body diodes BD are formed between the p-body regions 28 and the semiconductor substrate 26N and the n+ drain region 24.

In place of a SiC-based MISFET, a GaN-based FET or the like may be employed in the semiconductor device 100 (MISFET chips Q1 and Q4) applicable to the power conversion circuit 1.

Further, semiconductors with bandgap energies of, for example, 1.1 eV to 8 eV may be used for the semiconductor device 100 (MISFET chips Q1 and Q4) applicable to the power conversion circuit 1.

Modification

Figure 6:
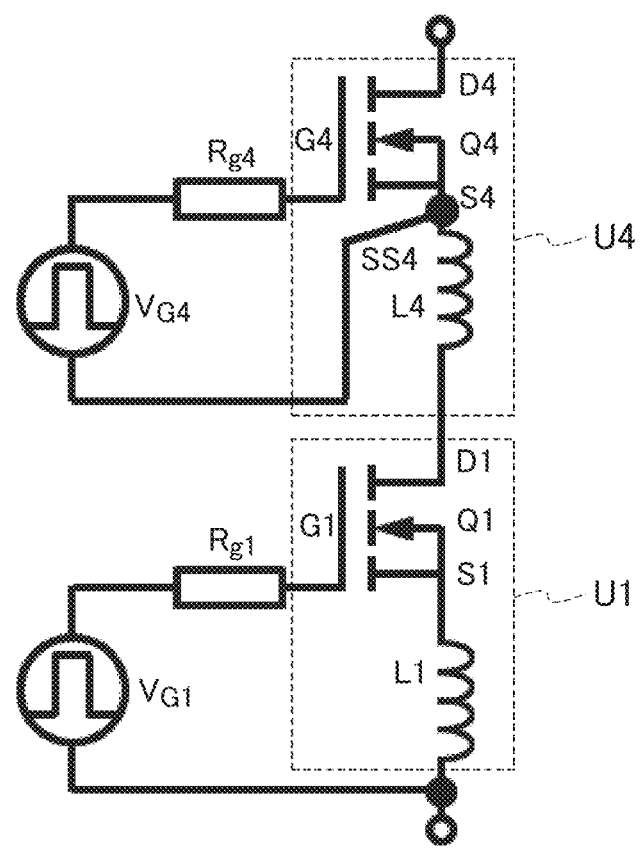
FIG. 6 shows a power conversion circuit according to another aspect of the present embodiment.
Figure 7:
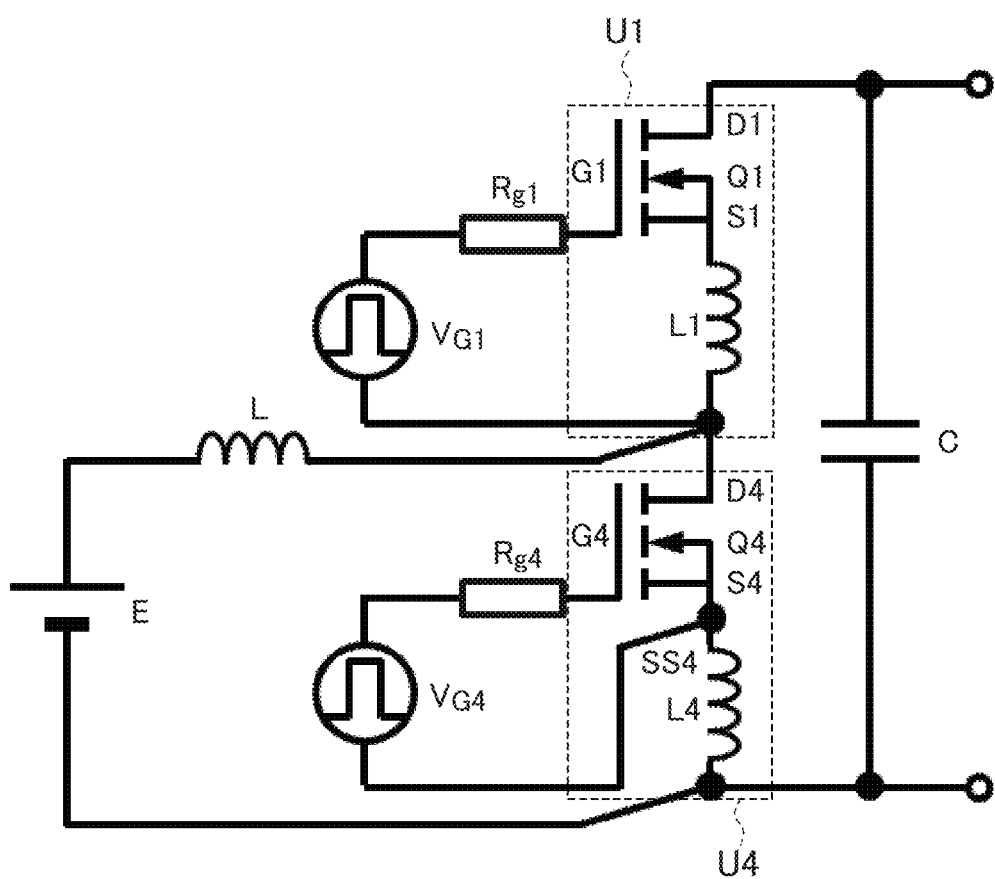
FIG. 7 shows the power conversion circuit according to another aspect of the present embodiment.
Figure 8:
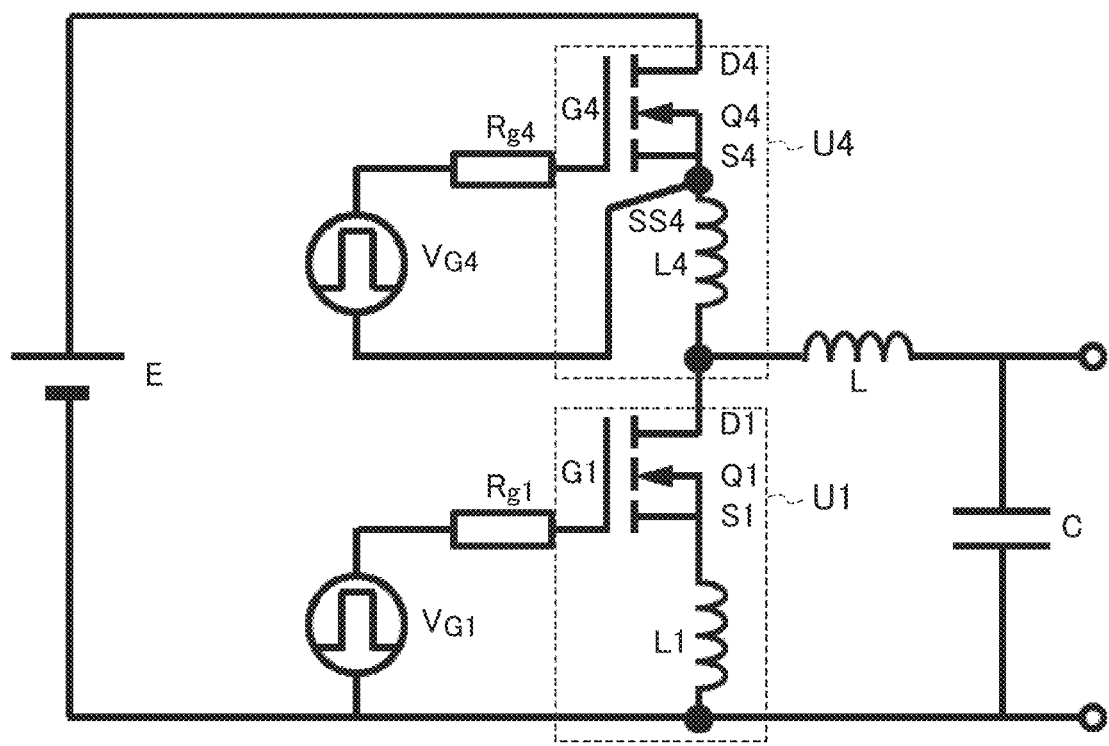
FIG. 8 shows the power conversion circuit according to another aspect of the present embodiment.

As shown in FIG. 6, regarding the connection relationship between the switching element and the synchronous rectifier element in the power conversion circuit 1, the source S4 of the MISFET chip Q4 operating as the switching element may be electrically connected to the drain D1 of the MISFET chip Q1 operating as the synchronous rectifier element via the inductance L4. Further, as shown in FIGS. 7 and FIG. 8, the power conversion circuit 1 shown in FIGS. 1 and FIG. 6 may further include the power source E, the capacitor C, and the inductor L.

Power Module

As described above, the power module equipped with the power conversion circuit 1 may have a half-bridge built-in module configuration. In the power module, the MISFET chip Q1 and the MISFET chip Q4 are incorporated in one module. In FIG. 3, the MISFET chip Q1 and the MISFET chip Q4 are each arranged in four chips in parallel.

Figure 9:
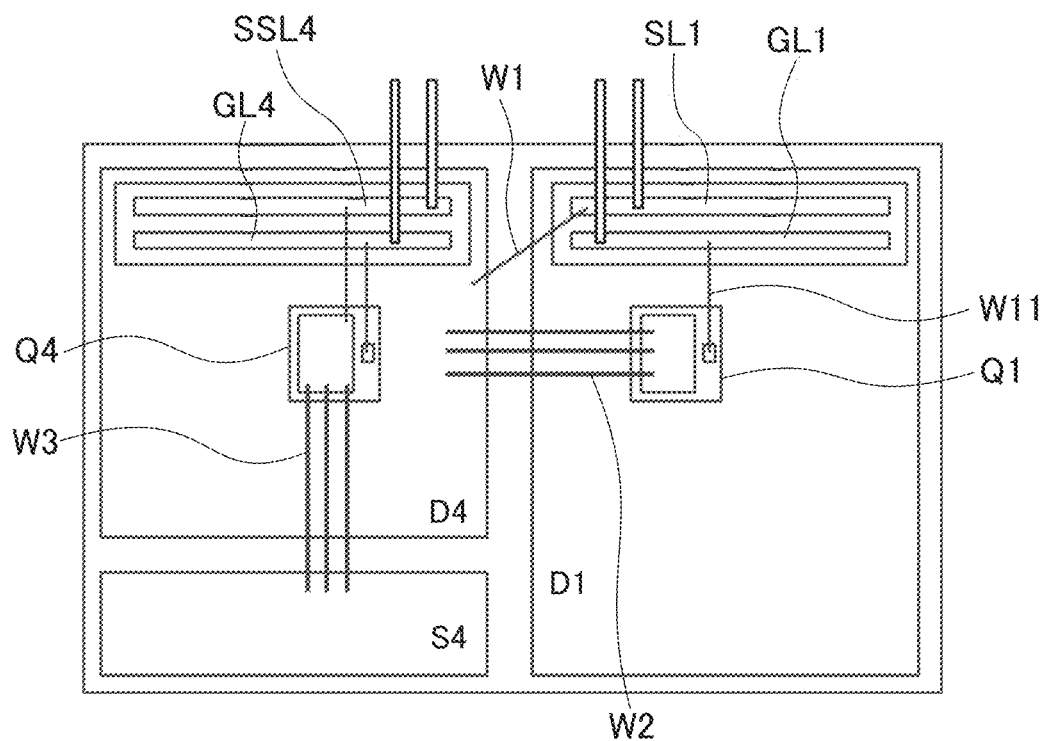
FIG. 9 is a simplified schematic plan pattern diagram of a power module according to the present embodiment, prior to formation of a resin layer in a half-bridge built-in module.
Figure 10:
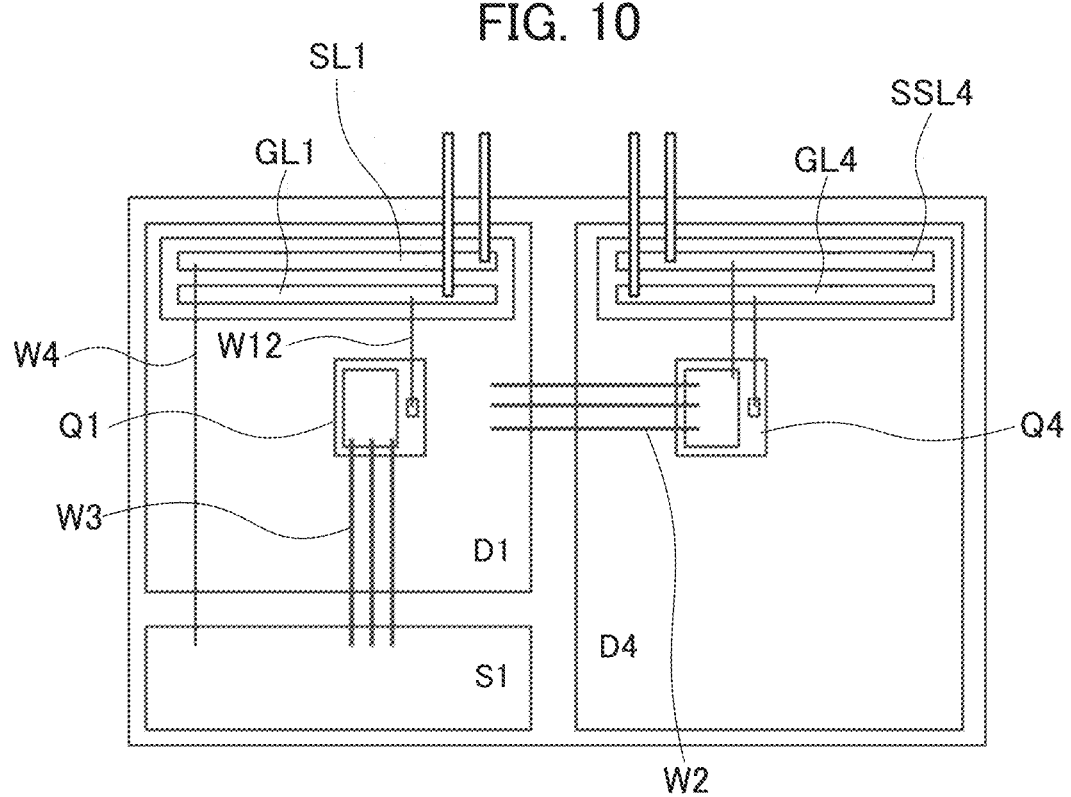
FIG. 10 is a simplified schematic plan pattern diagram of the power module according to the present embodiment, prior to formation of the resin layer in the half-bridge built-in module.
Figure 11:
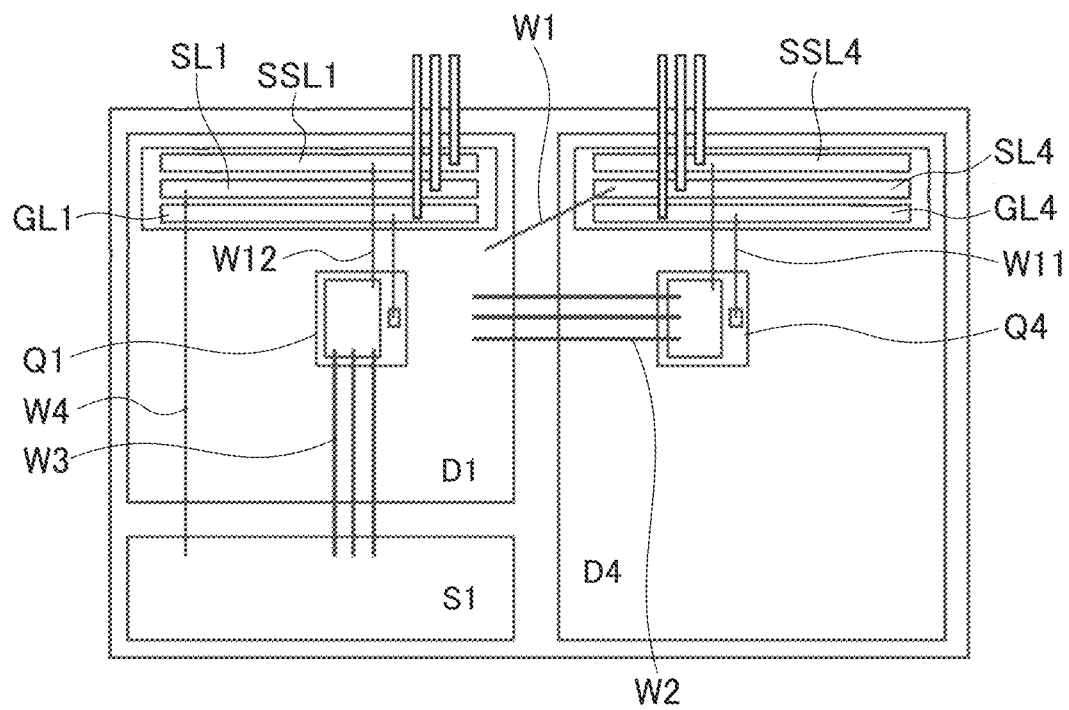
FIG. 11 is a simplified schematic plan pattern diagram of the power module according to the present embodiment, prior to formation of the resin layer in the half-bridge built-in module.

FIGS. 9 to FIG. 11 show an example of a simplified schematic planar pattern configuration in the power module.

As shown in FIG. 9, the transistor including the MISFET chip Q1 includes a source signal wiring pattern SL1 and a gate signal wiring pattern GL1, and the transistor including the MISFET chip Q4 includes a source sense signal wiring pattern SSL4 and a gate signal wiring pattern GL4. The gate of the MISFET chip Q1 is directly connected to the gate signal wiring pattern GL1 via the wiring W11. The gate of the MISFET chip Q1 is also electrically connected to the source signal wiring pattern SL1 via the wiring W1, the wiring W2, and the transistor (specifically, the drain D4) including the MISFET chip Q4. The current path passing through the wiring W1, the wiring W2, and the transistor including the MISFET chip Q4 can carry a large current because the current tolerance is greater than that of the current path passing through the wiring W11. Further, the gate of the MISFET chip Q4 is directly connected to the gate signal wiring pattern GL4 and the source sense signal wiring pattern SSL4 via wiring.

Further, as shown in FIG. 10, the transistor including the MISFET chip Q1 includes the source signal wiring pattern SL1 and the gate signal wiring pattern GL1, and the transistor including the MISFET chip Q4 includes the source sense signal wiring pattern SSL4 and the gate signal wiring pattern GL4. The gate of the MISFET chip Q1 is directly connected to the gate signal wiring pattern GL1 via the wiring W12. The gate of the MISFET chip Q1 is also electrically connected to the source signal wiring pattern SL1 via the wiring W3, the wiring W4, and the source S1 of the MISFET chip Q1. The current path passing through the wiring W3, the wiring W4, and the source S1 of the MISFET chip Q1 can carry a large current because the current tolerance is greater than that of the current path passing through the wiring W12. Further, the gate of the MISFET chip Q4 is directly connected to the gate signal wiring pattern GL4 and the source sense signal wiring pattern SSL4 via wiring.

Further, as shown in FIG. 11, the transistor including the MISFET chip Q1 includes a source sense signal wiring pattern SSL1, the source signal wiring pattern SL1, and the gate signal wiring pattern GL1, and the transistor including the MISFET chip Q4 includes the source sense signal wiring pattern SSL4, the source signal wiring pattern SL4, and the gate signal wiring pattern GL4. The gate of the MISFET chip Q1 is directly connected to the gate signal wiring pattern GL1 via the wiring W12. The gate of the MISFET chip Q1 is also electrically connected to the source signal wiring pattern SL1 via the wiring W3, the wiring W4, and the source S1 of the MISFET chip Q1. The current path passing through the wiring W3, the wiring W4, and the source S1 of the MISFET chip Q1 can carry a large current because the current tolerance is greater than that of the current path passing through the wiring W12. Further, the gate of the MISFET chip Q4 is directly connected to the gate signal wiring pattern GL4 and the source sense signal wiring pattern SSL4 through wiring. The gate of the MISFET chip Q4 is also electrically connected to the source signal wiring pattern SL4 via the wiring W1, the wiring W2, and the transistor (specifically, the drain D including the MISFET chip Q1. The current path passing through the wiring W1, the wiring W2, and the transistor including the MISFET chip Q1 can carry a large current because the current tolerance is greater than that of the current path passing through the wiring W11.

In the power module shown in FIG. 11, either the MISFET chip Q1 or the MISFET chip Q4 functions as a switching element. The source sense signal wiring of the transistor including the MISFET functioning as the switching element may be controlled such that the source sense signal wiring of the transistor is connected to the MISFET.

Each piece of signal wiring of the power module shown in FIGS. 9 to FIG. 11 is connected to an external extraction terminal (not shown).

Converter

Figure 14:
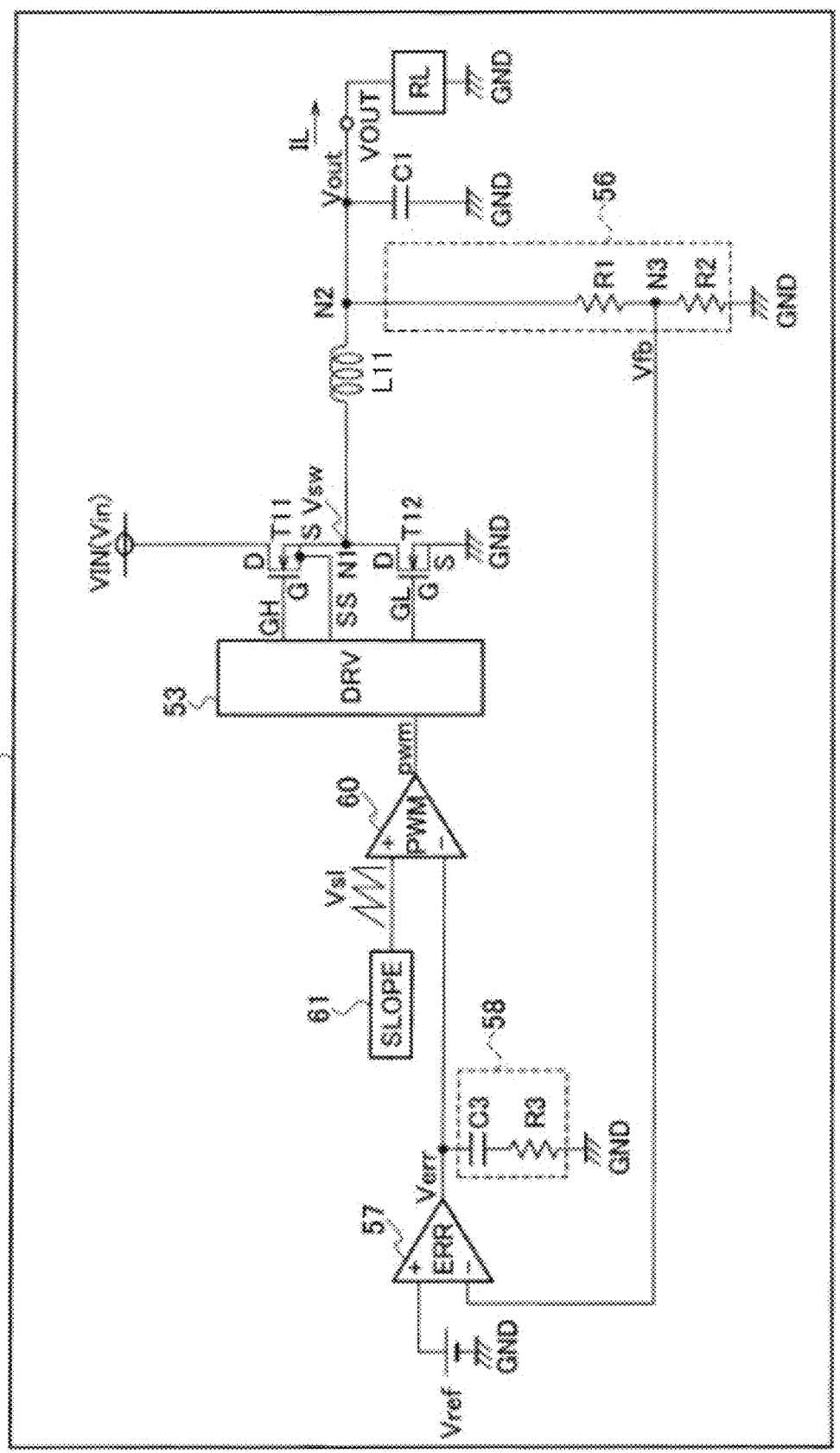
FIG. 14 is a circuit diagram of a converter according to the present embodiment, which is a DC/DC converter of a current-mode synchronous rectifier step-down type.

FIG. 14 is a circuit diagram showing a DC/DC converter of a current-mode synchronous rectifier step-down type including the power module according to the present embodiment. A DC/DC converter 51 steps down an input voltage Vin supplied to an input terminal VIN and generates a desired output voltage Vout at an output terminal VOUT.

The DC/DC converter 51 includes a switching element T11, a rectifier element T12, a drive circuit 53, a feedback voltage generation circuit 56, an error amplifier 57, a phase compensation circuit 58, a PWM comparator 60, a slope voltage generation circuit 61, an inductor L11, and a smoothing capacitor C1.

The switching element T11 is an N-channel MOS (metal oxide semiconductor) field effect transistor connected to the drive circuit 53, an output current detector 54 and the rectifier element T12, and functions as a switching transistor for controlling the current supplied to the inductor L11 by repeatedly switching on and off. The drain D of the switching element T11 is connected to the input terminal VIN. The source S of the switching element T11 is connected to the drain D of the rectifier element T12. A gate signal GH is applied to the gate G of the switching element T11 from the drive circuit 53. A source voltage of the switching element T11 is fed back to the drive circuit 53 via the source sense signal wiring SS. The switching element T11 is switched off when the gate signal GH is at a low level, and switched on when the gate signal GH is at a high level. The rectifier element T12 supplies a current toward the inductor L11 when the switching element T11 is switched off.

The rectifier element T12 is an N-channel MOS field effect transistor connected to the switching element T11 and the drive circuit 53, and operates complementarily as a synchronous rectifier transistor in synchronization with the switching element T11. The drain D of the rectifier element T12 is connected to the source S of the switching element T11. The common connection point between the rectifier element T12 and the switching element T11 is shown as a node N1. The rectifier element T12 is switched on when the switching element T11 is switched off, and is switched off when the switching element T11 is switched on. The source S of the rectifier element T12 is connected to the ground potential GND. A gate signal GL is applied to the gate G of the rectifier element T12 from the drive circuit 53. The rectifier element T12 is switched on when the gate signal GL is at a high level, and switched off when the gate signal GL is at a low level.

By complementarily switching on and off the switching element T11 and the rectifier element T12, a rectangular wave-like switching voltage Vsw appears at the node N1. By smoothing the switching voltage Vsw by means of the inductor L11 and the smoothing capacitor C1, the output voltage Vout is extracted to the output terminal VOUT. The inductor L11 and the smoothing capacitor C1 are connected in series between the node N1 and the ground potential GND, and the common connection point therebetween is indicated by a node N2. A voltage generated in the smoothing capacitor C1, namely the output voltage Vout, is generated at the node N2.

In the DC/DC converter 51, a step-down switch output stage is formed which steps down the input voltage Vin supplied to the input terminal VIN and generates the desired output voltage Vout at the output terminal VOUT by using the switching element T11, the rectifier element T12, the inductor L11, and the smoothing capacitor C1.

When the components of the DC/DC converter 51 are integrated into an IC, the switching element T11 and the rectifier element T12 may be incorporated in the IC or may be externally attached to the IC. When the switching element T11 and the rectifier element T12 are externally attached to the IC, external terminals for outputting each of the gate signal GH and the gate signal GL are required. An N-channel MOS field effect transistor may be used as the switching element T11. An IGBT or the like may be used as the switching element T11 and the rectifier element T12. The switching element T11 and the rectifier element T12 may be composed of bipolar transistors.

The drive circuit 53 is provided with a section (what is referred to as dead time) where the gate signal GH is at a low level and the gate signal GL is at a low level such that the gate signal GH is not at a high level and the gate signal GL is not at a high level, in order to prevent an excessive through-current supplied from the switching element T11 toward the rectifier element T12.

Further, the drive circuit 53 has a function of forcibly stopping a switching operation of the switch output stage in response to an abnormality protection signal that is not shown (a function of setting the gate signal GH output to the switching element T11 to be a low level and setting the gate signal GL output to the rectifier element T12 to be a low level).

The feedback voltage generation circuit 56 includes resistances R1 and R2 connected in series between the output terminal VOUT and the ground potential GND, and outputs a feedback voltage Vfb from a node N3, which is a common connection point of the resistances R1 and R2. The feedback voltage Vfb is a voltage proportional to the voltage generated at the smoothing capacitor C1, and is also a DC voltage proportional to the output voltage Vout generated at the output terminal VOUT.

The error amplifier 57 generates an error voltage Verr according to the difference between the reference voltage Vref input to a non-inverting input terminal (+) and the feedback voltage Vfb input to an inverting input terminal (−). The error voltage Verr increases when the feedback voltage Vfb is lower than the reference voltage Vref, and the error voltage Verr decreases when the feedback voltage Vfb is higher than the reference voltage Vref. The error voltage Verr is output from the output side of the error amplifier 57. It should be noted that it is also possible to convert the error voltage Verr into a current and output the current from the output side of the error amplifier 57. An error amplifier having such a configuration is known as a transconductance error amplifier.

The phase compensation circuit 58 includes a series circuit including a resistance R3 and a capacitor C3 connected in series between the output terminal of the error amplifier 57 and the ground potential GND. It is well known that such a phase compensation circuit is used in a DC/DC converter. The phase compensation circuit 58 is used to increase a difference with respect to the phase delay of 180 degrees in the DC/DC converter 51, that is, a phase margin. For example, if a phase when the loop gain of the DC/DC converter 51 is 0 db (Gain 1-fold) is 120 degrees, the phase margin is 180 degrees–120 degrees=60 degrees. It is said that a phase margin of, for example, 45 degrees or more is sufficient.

The PWM comparator 60 compares the error voltage Verr applied to the inverting input terminal (−) with a slope signal Vsl applied to the non-inverting input terminal (+) and generates a pulse width modulation signal pwm. The DC/DC converter 51 performs PWM control based on the pulse width modulation signal pwm.

The pulse width modulation signal pwm output from the PWM comparator 60 is applied to the drive circuit 53 in the subsequent stage to switch on and off the switching element T11 and the rectifier element T12 complementarily. A sequential circuit (for example, an RS flip-flop) not shown is provided in the drive circuit 53. A clock signal is applied to a set terminal of the RS flip-flop, and the pulse width modulation signal pwm is applied to a reset terminal. In this case, the clock signal corresponds to a set signal of the RS flip-flop, and the pulse width modulation signal pwm corresponds to a reset signal of the RS flip-flop.

The slope voltage generation circuit 61 generates the slope signal Vsl for operating the PWM comparator 60 by pulse width modulation. The slope signal Vsl is a triangular wave signal generated based on the clock signal.

In the converter provided with the power module according to the present embodiment, the power conversion circuit including the switching element connected to the source sense signal wiring and the rectifier element not connected to the source sense signal wiring is employed. Accordingly, the converter according to the present embodiment prevents erroneous switching-on by utilizing the switching characteristics of the switching element connected to the source sense signal wiring and utilizing the low starting point of the increase in voltage of the rectifier element not connected to the source sense signal wiring, thereby making it possible to ensure operation stability of the converter.

Figure 15:
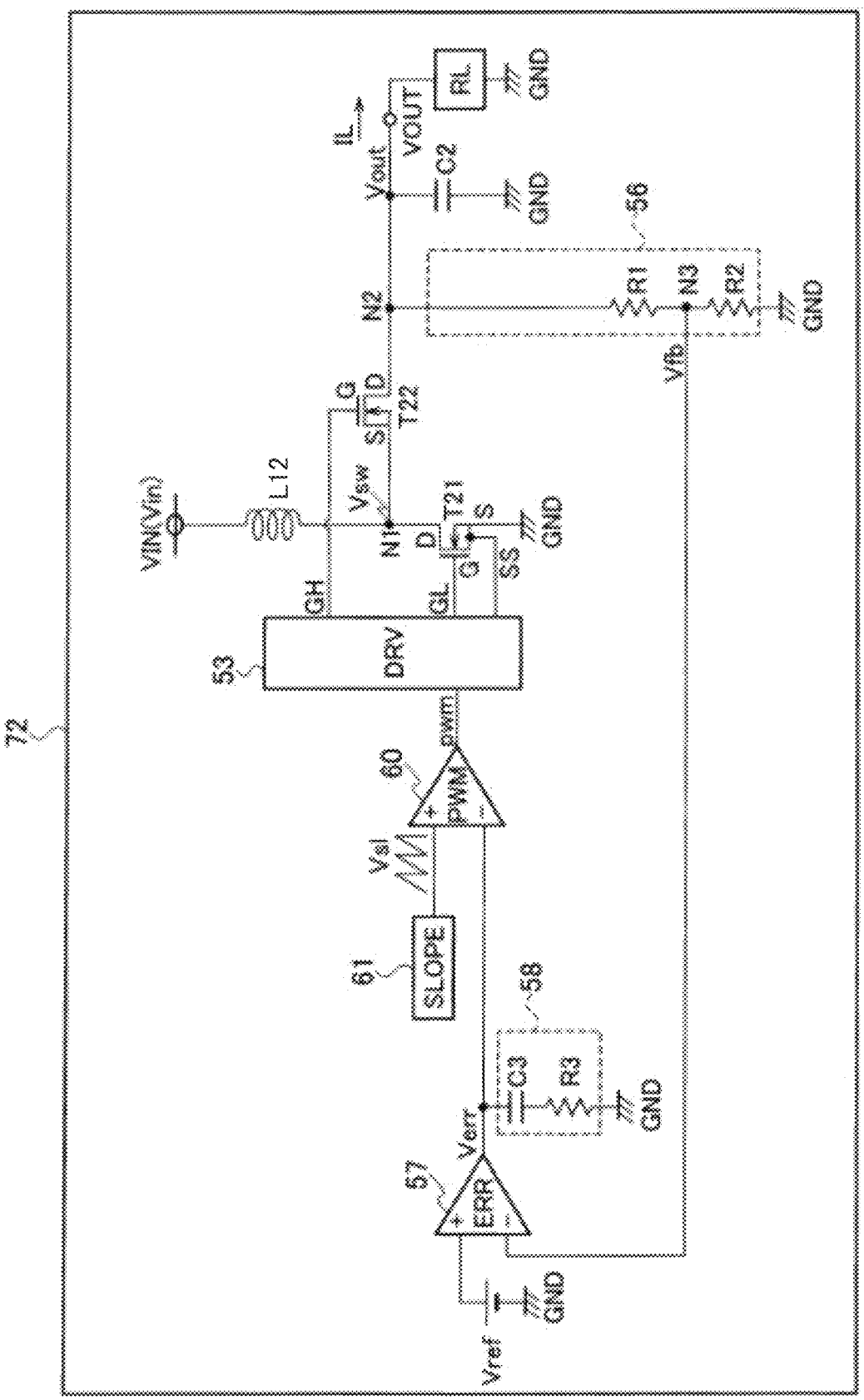
FIG. 15 is a circuit diagram of a converter according to the present embodiment, which is a DC/DC converter of a current-mode synchronous rectifier step-up type.

FIG. 15 is a circuit diagram showing a DC/DC converter of a current-mode synchronous rectifier step-up type including the power module according to the present embodiment. A DC/DC converter 72 steps up the input voltage Vin supplied to the input terminal VIN and generates the desired output voltage Vout at the output terminal VOUT.

The DC/DC converter 72 includes a switching element T21, a rectifier element T22, the drive circuit 53, the feedback voltage generation circuit 56, the error amplifier 57, the phase compensation circuit 58, the PWM comparator 60, the slope voltage generation circuit 61, an inductor L12, and a smoothing capacitor C2.

The DC/DC converter 72 is different in the circuit sections in the stage subsequent to the drive circuit 53 from the step-down type shown in FIG. 14. The other circuit sections are the same. The circuit sections different from the ones shown in FIG. 14 will be described below.

The switching element T21 is an N-channel MOS field effect transistor connected to the rectifier element T22, the drive circuit 53 and the inductor L12, and functions as a switching transistor for controlling the current supplied to the inductor L12 by repeatedly switching on and off. The switching element T21 operates complementarily in synchronization with the rectifier element T22. The source S of the switching element T21 is connected to the ground potential GND. The drain D of the switching element T21 is commonly connected to the source S of the rectifier element T22 and one end of the inductor L12. This common connection point is indicated by the node N1. The gate signal GL is applied to the gate G of the switching element T21 from the drive circuit 53. A source voltage of the switching element T21 is fed back to the drive circuit 53 via the source sense signal wiring SS. The switching element T21 is switched on when the gate signal GL is at a high level, and switched off when the gate signal GL is at a low level.

The other end of the inductor L12 is connected to the input terminal VIN having the input voltage Vin supplied thereto. That is, the switching element T21 is coupled to the input voltage Vin via the inductor L12. A current supplied to the inductor L12 is controlled by the switching element T21.

The source S of the rectifier element T22 is connected to the drain D of the switching element T21 and one end of the inductor L12. The drain D of the rectifier element T22 is connected to the node N2, i.e., the output terminal VOUT. The gate signal GH is applied to the gate G of the rectifier element T22 from the drive circuit 53. The rectifier element T22 is switched off when the gate signal GH is at a low level, and switched on when the gate signal GH is at a high level.

The smoothing capacitor C2 is connected between the node N2, namely the output terminal VOUT, and the ground potential GND. The smoothing capacitor C2 performs rectification and smoothing operations together with the inductor L12 and the rectifier element T22.

As explained in the above description, the synchronous rectifier step-up type DC/DC converter 72 is different from the synchronous rectifier step-down type DC/DC converter 51 shown in FIG. 14. Since the other circuit sections are the same as those in FIG. 14, the description thereof is omitted. The switching element connected to the source sense signal wiring and the rectifier element not connected to the source sense signal wiring are employed also in the DC/DC converter 72. The DC/DC converter shown in FIG. 14 exemplifies a step-down type, and the DC/DC converter shown in FIG. 15 exemplifies a step-up type; however, it goes without saying that the present embodiment can be applied to what is referred to as a step-up/step-down DC/DC converter, which is designed to switch between the step-down type and step-up type.

In addition, although not shown, an inverter including the power conversion circuit of the present embodiment may be configured. In order to function as an inverter, when an element in the inverter is to function as a switching element, control may be performed such that the element connected to the source sense signal wiring is used.

Other Embodiments

As noted above, although some embodiments have been described, it should be understood that the statements and drawings that form part of the disclosure are exemplary and are not limiting. Various alternative embodiments, embodiments and operational techniques will become apparent to those skilled in the art from this disclosure. Thus, the present embodiment includes various embodiments and the like not described herein.

The invention claimed is:

1. A power module comprising:
a switching transistor consisting of a SiC MISFET (metal-insulator-semiconductor field effect transistor) and including a first source, a first drain, a first gate that controls conduction between the first source and the first drain, and a source sense connected to the first source;
a synchronous rectifier transistor consisting of a SiC MISFET, including a second source, a second drain, a second gate that controls conduction between the second source and the second drain, and electrically connected in series to the switching transistor;
an output terminal electrically connected to a connection point between the second drain and the first source;
a capacitor electrically connected between the output terminal and a ground potential; and
a power terminal electrically connected to the first drain and the second source, respectively,
wherein an inductance of the first source is smaller than an inductance of the second source.

2. A power module comprising:
a first transistor having a function of exciting a first inductor between a first source pad and a first source wiring, wherein the first source pad is connected to first source sense signal wiring and a first drain of the first transistor is connected to a first drain wiring;
a second transistor having a function of releasing power stored in the first inductor, wherein a second source pad is connected to a second source wiring and a second drain of the second transistor is connected to the first source wiring;
a first gate signal wiring electrically connected to a first gate pad of the first transistor; and
the first source sense signal wiring electrically connected to the first source pad;
a second gate signal wiring electrically connected to a second gate pad of the second transistor,
a second source sense signal wiring electrically connected to a second source pad;
a first source signal wiring (SL4) electrically connected to the first source pad via the first source wiring; and
a second source signal wiring electrically connected to the second source pad via the second source wiring.

3. The power module according to claim 2, wherein an inductance of the first inductor is smaller than a source inductance of the second transistor.

4. The power module according to claim 2, further comprising a capacitor electrically connected to the first source wiring and the second drain wiring.

5. The power module according to claim 4, further comprising an output terminal electrically connected to the first source wiring.

6. The power module according to claim 2, further comprising a power terminal electrically connected to the first drain wiring and the second source wiring.

7. The power module according to claim 2, wherein the first transistor functions as a switching element, and the second transistor functions as a synchronous rectifier element.

8. A converter comprising the power module according to claim 2.

9. An inverter comprising the power module according to claim 2.

10. A power module comprising:
a first transistor having a function of exciting a first inductor between a first source pad and a first source wiring, wherein the first source pad is connected to first source sense signal wiring and a first drain of the first transistor is connected to a first drain wiring;
the second transistor having a function of releasing power stored in the first inductor wherein a second source pad is connected to the first drain wiring and a second drain of the second transistor is connected to a second drain wiring;
a first gate signal wiring electrically connected to a first gate pad of the first transistor;
the first source sense signal wiring electrically connected to a first source pad of the first transistor; and
a second gate signal wiring electrically connected to a second gate pad of the second transistor,
wherein
the first drain wiring is connected to the second source pad
the second source pad is connected to the second source signal wiring via the first drain wiring,
a first wiring connects between the second source pad and the first drain wiring,
a current tolerance of the first wiring is greater than a current tolerance of a wiring directly connecting between the second gate signal wiring and the second gate pad.

11. A power module comprising:
a first transistor having a function of exciting a first inductor between a first source pad and a first source wiring, wherein a first source pad is connected to a first source sense signal wiring;
a second transistor having a function of releasing power stored in the first inductor wherein a second drain of the second transistor is connected to the first source wiring and a second source pad is connected to a second source wiring via a first wiring;
a first gate signal wiring electrically connected to a first gate pad of the first transistor; and
a second gate signal wiring electrically connected to a second gate pad of the second transistor; wherein
the first source pad is electrically connected to the second drain via the first source wiring; and
the second source pad is connected to the second source signal wiring via the second source wiring, wherein
a current tolerance of a second wiring connecting between the second source wiring and the second source signal wiring is smaller than a current tolerance of the first wiring directly connecting between the second source pad and the second source wiring.

* * * * *